Oct. 27, 1936. G. F. McCAHEY Re. 20,146
CORE COVERING MACHINE
Original Filed May 20, 1929 3 Sheets-Sheet 1
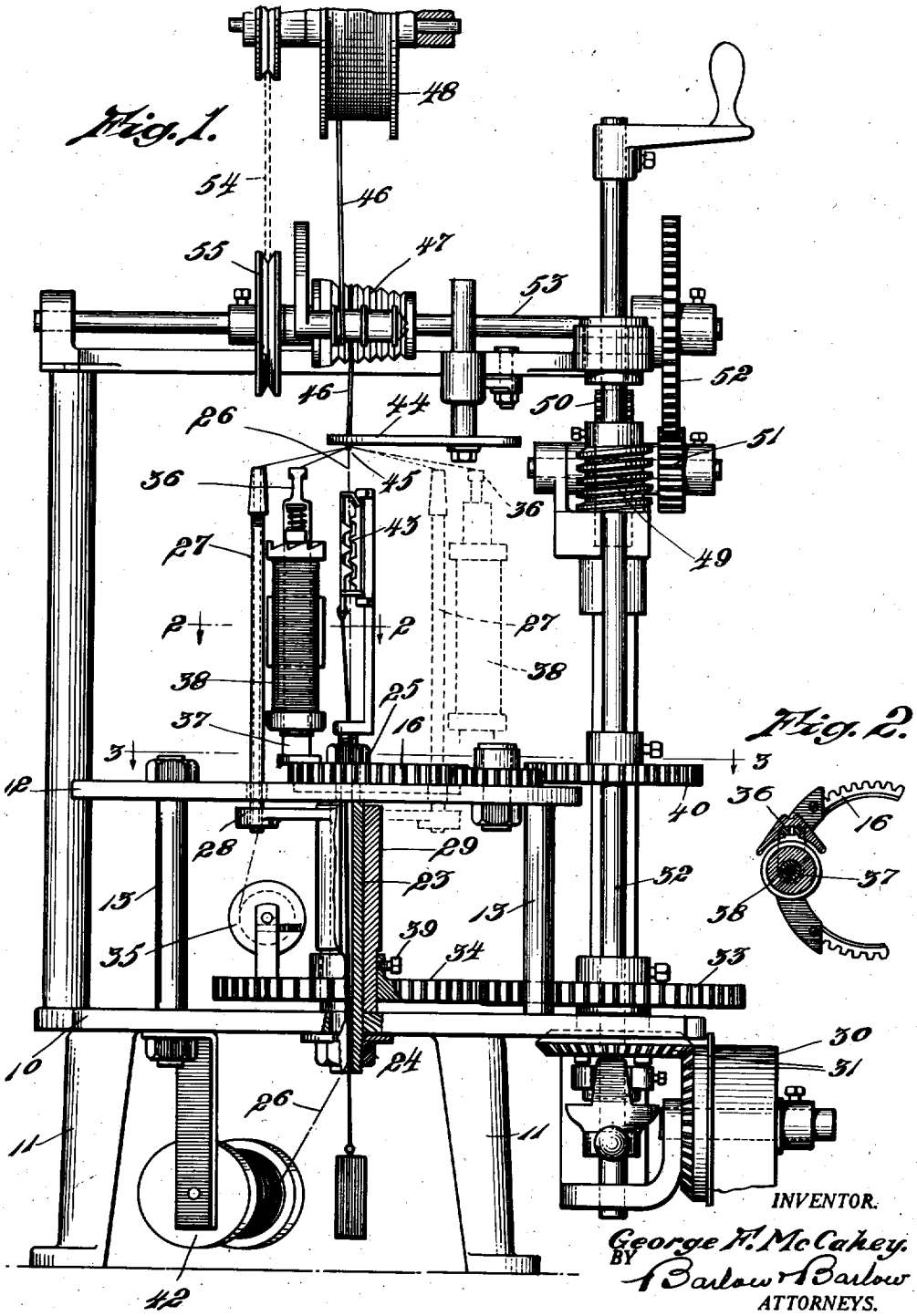
INVENTOR.
George F. McCahey.
BY
Barlow & Barlow
ATTORNEYS.

Oct. 27, 1936. G. F. McCAHEY Re. 20,146
CORE COVERING MACHINE
Original Filed May 20, 1929 3 Sheets-Sheet 2
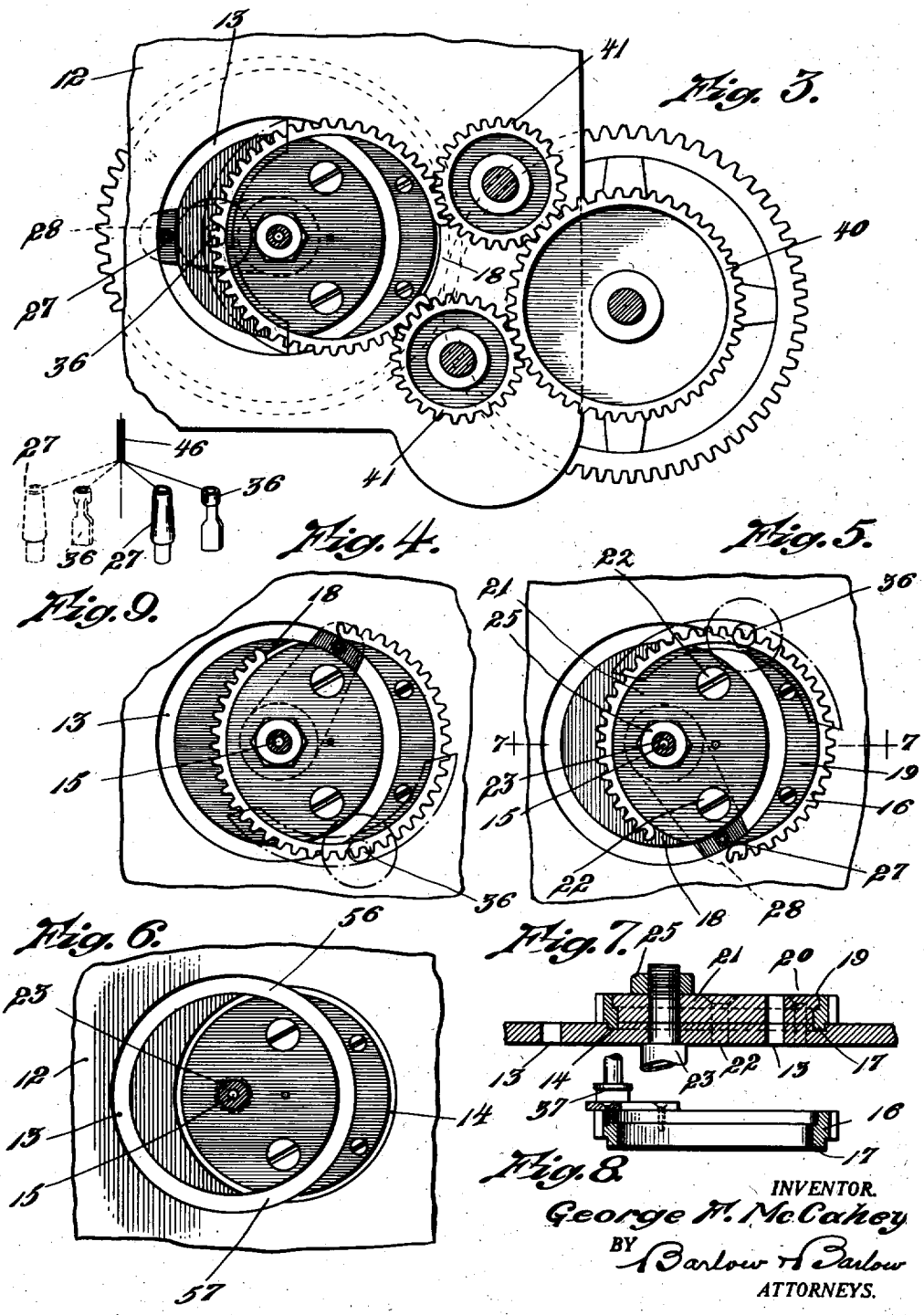
INVENTOR.
George F. McCahey
BY Barlow & Barlow
ATTORNEYS.

CORE COVERING MACHINE

Original Filed May 20, 1929 3 Sheets-Sheet 3

INVENTOR.
George F. McCahey.
BY Barlow & Barlow
ATTORNEYS.

Reissued Oct. 27, 1936

Re. 20,146

UNITED STATES PATENT OFFICE 20,146

CORE COVERING MACHINE

George F. McCahey, Providence, R. I., assignor of one-half to William C. Johnson, Providence, R. I.

Original No. 1,805,494, dated May 19, 1931, Serial No. 364,660, May 20, 1929. Application for reissue May 4, 1933, Serial No. 669,361

9 Claims. (Cl. 96—3)

This invention relates to an improved core-covering machine; and has for its object to provide a machine of this character which is adapted to wind two strands of material in opposite directions alternately over and under each other about the core to cover the same.

The invention further consists in the provision of means in the machine for feeding the core in the direction of its length and winding two covering strands in opposite directions about the traveling core to cross each other twice each revolution.

A further object of the invention is to arrange the mechanisms of the machine so that the strands as laid on the core cross each other on diametrically opposite sides of the core, that portion of the strand between the points of crossing being caused to lie in direct contact with the core.

The invention further consists in the provision of a machine for covering the core, the machine being provided with a pair of guide members for laying the covering strands upon the moving core and for revolving these guide members in circles and in opposite directions about the core, the circular paths being disposed to cross each other alternately as the guide members revolve about the core.

A further object of the invention is to provide a ring-shaped gear for carrying one of the strand-laying guide members, the gear having an opening thru its periphery into and out of which the other guide member passes while the two guides are caused to revolve in the opposite directions about the core to lay the covering strands upon the same.

The invention further includes a novel method of winding utilizing two strands to cover a core, the winding locking the core and strands together, and the novel covered thread obtained by the novel apparatus and the novel method of winding.

With these and other objects in view, the invention consists of certain novel features of construction and of operation, as will be more fully described, and particularly pointed out in the appended claims.

In the accompanying drawings:

Fig. 1 is a side elevation of my improved core winding machine partly in section.

Fig. 2 is a detail illustrating a portion of the ring gear on which I mount a strand-laying guide member and one of the package carriers, sectioned on line 2—2 of Fig. 1.

Fig. 3 is a plan view showing a section on line 3—3 of Fig. 1, and showing the ring-shaped gear and the two spaced drive gears thru which the ring gear is revolved, and showing the strand-laying guide spindles in juxtaposition both on the same side of the core and passing each other in opposite directions.

Fig. 4 shows the lower guide spindle and the upper guide spindle as advanced a little more than a quarter turn in opposite directions from the position shown in Fig. 3 and just entering the ring gear thru its peripheral opening.

Fig. 5 shows the upper guide spindle and the lower guide spindle as having advanced approximately three quarters of a turn, and the lower guide spindle as just passing out of the ring gear thru the opening in its periphery.

Fig. 6 illustrates the two circular paths which are eccentric to each other and thru which paths the different guide members pass during their rotation about the core, which paths intersect each other.

Fig. 7 is a section on line 7—7 of Fig. 5, showing the ring gear as mounted upon the upper deck member and the parts which form the hub for the gear as supported on the hollow central standard thru which the core is led.

Fig. 8 is a side elevation showing the ring gear detached and in section with the carrier guide spindle mounted thereon.

Fig. 9 shows the two guide spindles in full and in dotted lines, as passing alternately on the inside and on the outside of each other and as then revolving about the core.

Figure 17:
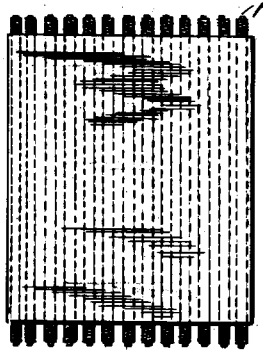
Fig. 17 shows a short length of fabric into which the jacketed threads wound on my improved machine are woven.
Figure 10:
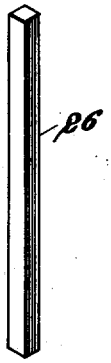
Fig. 10 shows a short length of elastic core.
Figure 11:
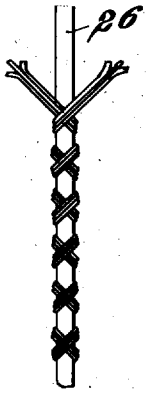
Fig. 11 shows the elastic core in stretched condition with the two sets of strands wound upon the core while in this stretched condition.
Figure 13:
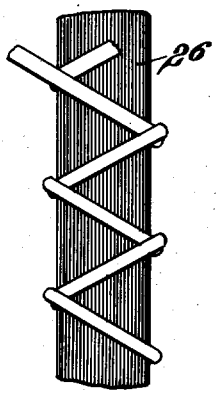
Fig. 13 is a view of the wound core at right angles to that of Fig. 12, showing the covering strands as disposed alternately over and under each other at their points of crossing.
Figure 12:
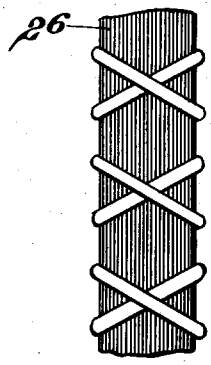
Fig. 12 is a greatly enlarged view showing the core stretched or extended with the strands laid in opposite directions and crossing each other at intervals along the length of the core.
Figure 14:
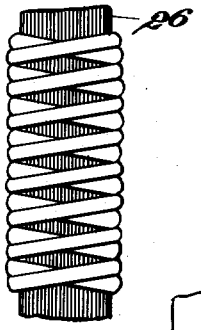
Fig. 14 is the same as Fig. 12 but showing the core as being but slightly stretched or extended with the edges of the covering strands nearly abutting each other.
Figure 15:
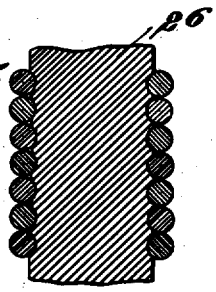
Fig. 15 shows the core as contracted with the strands imbedded into the body of the softer core.
Figure 16:
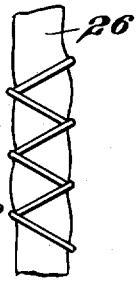
Fig. 16 shows the core as being laterally distorted into zigzag shape which effect is produced when under excessive tension.

My improved machine for laying covering strands onto such cores as wire, elastic threads and the like, may be run at a very high velocity, much faster than the ordinary braiding machine as the covering strand-laying members each rotates in a circle about the core. When covering an elastic core, the core is preferably held under tension during the covering operation and fed in the direction of its length while the two covering strand-laying guide members revolve in opposite directions about the core and the mechanism is so arranged that these guide members move in circular paths which are eccentric to each other and which paths intersect each other so that the guide members pass each other in opposite directions twice in each revolution and lay the covering strands alternately over and under each other to bind each other upon the core being covered.

By my present method of winding two covering strands about a core the strands themselves serve as a stop to limit the stretch of the core and when this core is stretched to a considerable degree the opposite diagonal windings cause the core to be distorted laterally thus effectively preventing the core from being withdrawn from its sheath or covering and also prevents the whole thread from being readily withdrawn from the fabric into which it is woven.

Then again, in some instances, when it is desired to wind or form a distinguishing mark into the structure of the covering, I may employ at least one of the two covering strands of a distinguishing color or structure, whereby a line or streak is formed along the length of the covering by this winding of strands upon the core; and the following is a detailed description of the present embodiment of my invention and showing one construction of winding machine by which these advantageous results are accomplished:—

With reference to the drawings, 10 designates the lower deck plate of my improved machine which is supported on the usual legs 11, and 12 designates the upper deck plate which is spaced from and supported on standards 13 from the lower deck plate.

The upper deck plate 12 is provided with a circular channel 13a therethru, see Figs. 6 and 7, and is also provided with a circular recess 14, which two circles provide paths of travel of the two different strand-laying guide members as they revolve about the core, which circular paths intersect each other as shown at 56 and 57.

In the circular groove 14 is mounted a ring gear 16, see Fig. 8, having a guide flange 17 which travels in the groove 14, and this ring gear has an opening 18 in its periphery to permit the passage, both entrance and exit, of one of the guide members, as presently described.

A trunnion guide block for this ring gear having a part 19, is secured to the deck plate 12 by screws 20 while the part 21 of this block is secured to a section of the upper deck plate by screws 22 and this whole member including parts 19 and 21, is supported in position flush with the upper deck plate, part 21 being mounted on and secured to the upper end of the hollow standard 23 by nut 25, the lower end of which is secured to the lower deck plate by means of the nut 24.

In order to wind the two strands in opposite directions about the core 26, I have provided a lower strand laying guide tube 27 which is supported on the arm 28 located below the upper deckplate which arm extends laterally from the sleeve 29 rotatably mounted on the central tubular standard 23 and this sleeve 29 is revolvable from the pulley 30 thru gears 31, upright shaft 32, gears 33 and 34, the latter gear being secured to the sleeve 29 by set screw 39 and carried on this gear, is shown the covering strands supply spool 35. The other guide member 36 of the two, is supported at 37 upon the ring gear 16, see Fig. 8, and a supply package or spool 38 is carried on this ring gear to deliver the covering strand thru the eye of this guide tube 36.

This ring gear, owing to the peripheral section being removed therefrom, is driven by a pair of spaced idler gears 41 from the single gear 40. The space between these idler gears is governed by the extent of the opening 18 in the ring gear so that during the time the opening is passing one of these drive gears the teeth are properly engaged by the other of these drive gears to produce an uninterrupted drive of this ring gear.

The core 26 is led from the spool 42 up thru the tubular standard 23, thru the tension control feed device 43, and guide 44 beneath which guide at the point 45 the core is covered by the winding of the two covering strands about it, the covered core 46 is now led about the feed spool 47 which is driven in any convenient way thence the thread is taken up by the winding drum 48 above. This feed spool 47 is herein shown as being driven in time with the rest of the machine thru the worm 49, worm gear 50, pinion 51 and gear 52 which rotates the spool shaft 53 in the proper time and the take-up drum 48 is shown as being driven at the proper speed thru a belt 54 from pulley 55.

By my improved operation and my improved construction of core-covering machine, it will be seen that the two guide tubes or members 27 and 36 thru which the two covering strands are passed are caused to revolve in opposite directions about the core 26 and to follow the circular paths which intersect each other at the points 56 and 57. Thus these guide members are caused to lay these strands alternately under and over each other upon the core, the crossings being twice each revolution and on diametrically opposite sides of the core, that portion of the strands between the crossings lying directly upon or against the surface of the core thus gripping the core and preventing it from being readily withdrawn from its covering or sheath.

The foregoing description is directed towards the construction illustrated, but I desire it to be understood that I reserve the privilege of resorting to all the mechanical changes to which the device is susceptible, and to change the operation and the product obtained, the invention being defined and limited only by the terms of the appended claims.

I claim:

1. In a core-covering machine, a deck plate, means for feeding a core, means for supplying one core covering strand below said deck plate and a second core covering strand above said deck plate, a pair of guide members for said strands respectively supported below and extending through the deck plate and supported above the deck plate, and means for revolving said guide members in different paths and in opposite directions about the core, so as to cross each other twice in each revolution to alternately pass each guide member between the core and the other guide member and beyond the other guide member.

2. In a core-covering machine, a deck plate, means for feeding a core, means for supplying one core covering strand below said deck plate and a second core covering strand above said deck plate, a pair of guide members for said strands respectively supported below and extending through the deck plate and supported above the deck plate, means for tensioning the strands leading from said packages, and means for revolving said guide members in different paths and in opposite directions about the core, so as to cross each other twice in each revolution to alternately pass each guide member between the core and the other guide member and beyond the other guide member.

3. In a core covering machine, a deck plate, means for feeding a core through said deck plate, means for supplying two core covering strands, a guide member for each strand, and means for revolving said guide members in different paths and in opposite directions about the core, so as to cross each other twice in each revolution to alternately pass each guide member between the core and the other guide member and beyond the other guide member.

4. In a core covering machine, a deck plate, means for feeding a core through said deck plate, means for supplying two core covering strands, a guide member for each strand, means for tensioning the core, and means for revolving said guide members in different paths and in opposite directions about the core, so as to cross each other twice in each revolution to alternately pass each guide member between the core and the other guide member and beyond the other guide member.

5. In a core-covering machine, a deck plate, means for feeding a core through said deck plate, means for supplying one core covering strand below said deck plate and a second core covering strand above said deck plate, a pair of guide members for said strands respectively supported below and extending through the deck plate and supported above the deck plate, and means for revolving said guide members in different paths and in opposite directions about the core, so as to cross each other twice in each revolution to alternately pass each guide member between the core and the other guide member and beyond the other guide chamber.

6. In a core covering machine, a rotatable ring element having a peripheral opening, a strand guide on said ring element, a second strand guide, and means for rotating said second strand guide in a circular path eccentric to the circular path of said first strand guide, said second strand guide entering into and exiting from said ring element in each rotation.

7. In a core covering machine, two rotatable strand guides, and means for rotating said strand guides in opposite directions in separate circular paths to cross each other twice in each revolution to alternately pass each guide between the core and the other guide and beyond the other guide, said circular paths intersecting, the centers of the separate circular paths being positioned in the common area of said intersecting paths.

8. In a core covering machine, a plate having a circular slot, a rotatable strand guide guided in said slot, an annular element rotatably positioned adjacent said plate and having an opening in the periphery thereof, a second strand guide on said annular element, the paths of movement of said strand guides intersecting, and means for rotating said first strand guide and said annular element in timed relation to pass said first strand guide into and out of said annular element each revolution thereof.

9. In a core covering machine, a plate having a circular slot, means for feeding a core through said plate within the area bounded by said circular slot, a rotatable strand guide guided in said slot, an annular element rotatably positioned adjacent said plate and having an opening in the periphery thereof, a second strand guide on said annular element, the paths of movement of said strand guides intersecting, and means for rotating said first strand guide and said annular element in timed relation to pass said first strand guide into and out of said annular element each revolution thereof.

GEORGE F. McCAHEY.